June 1, 1971 D. E. FOLLIS 3,581,334
CAR WASHING APPARATUS

Filed Oct. 31, 1969 3 Sheets-Sheet 1

INVENTOR.
DONALD E. FOLLIS
BY Fulwider, Patton, Rieber,
Lee and Utecht
ATTORNEYS

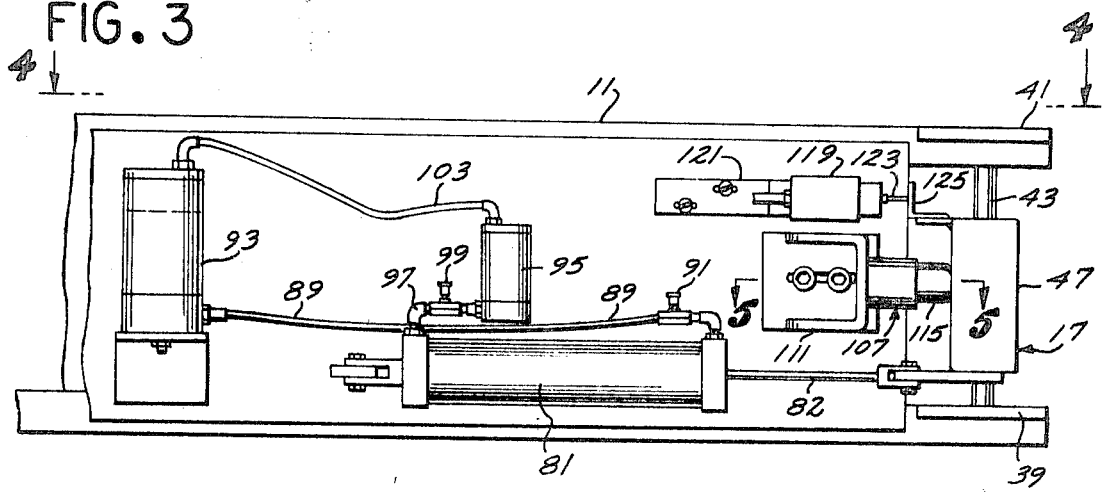
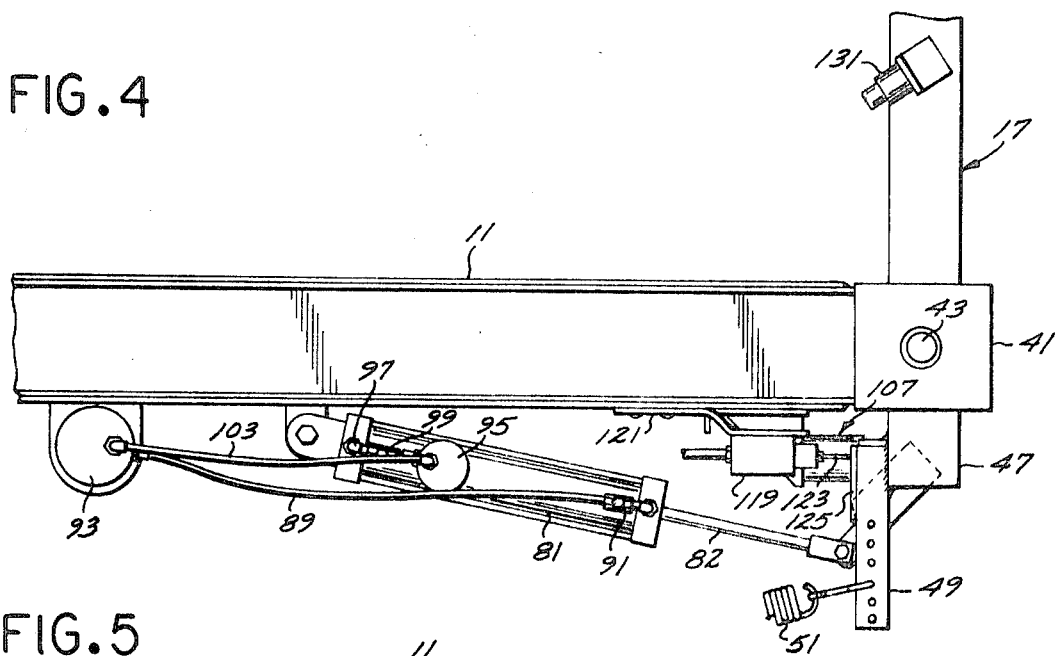
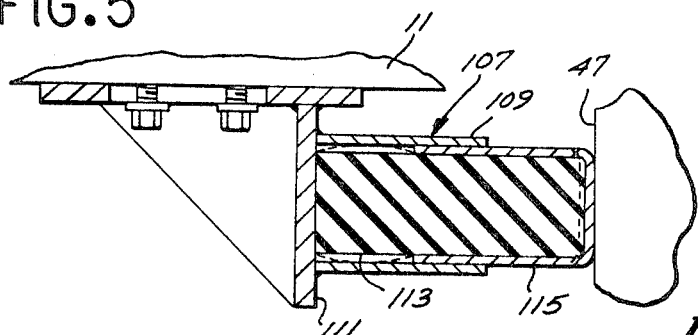

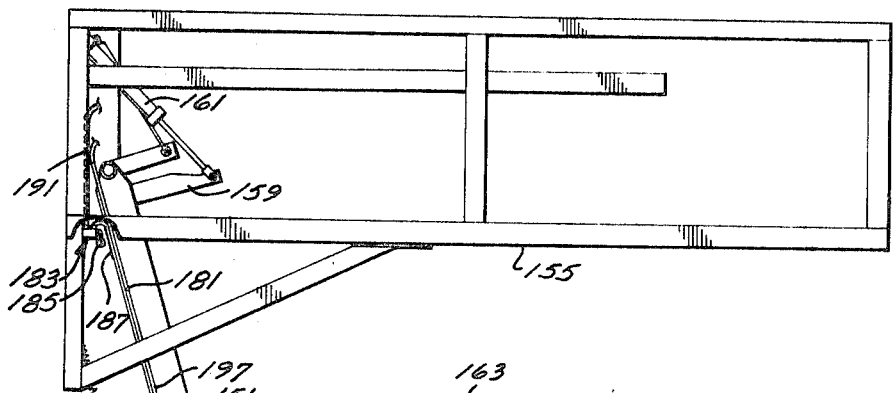
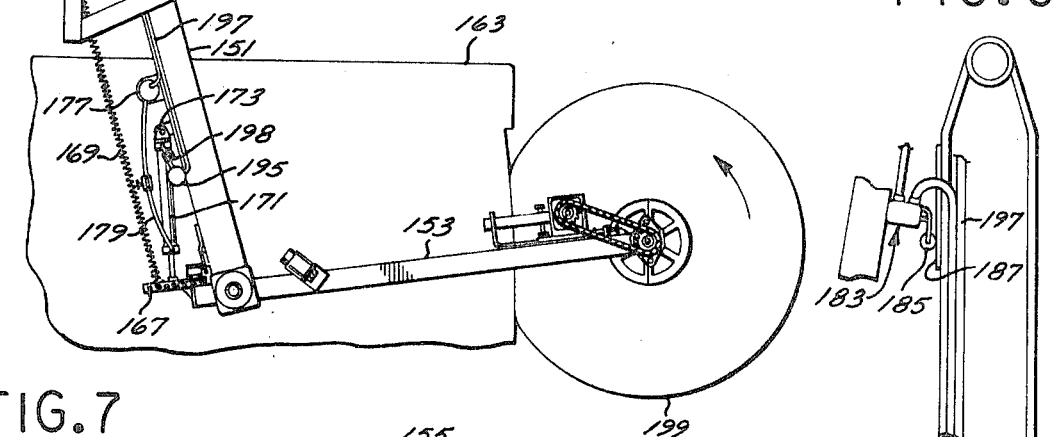
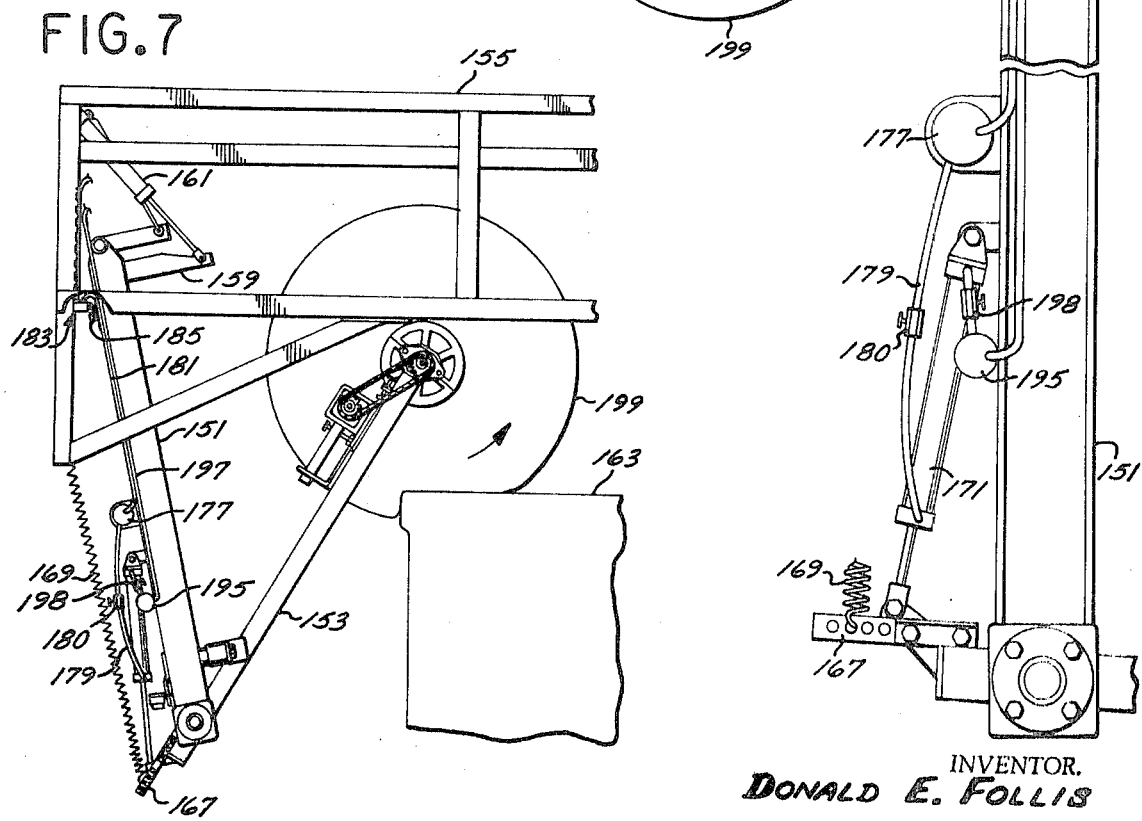

United States Patent Office 3,581,334
Patented June 1, 1971

3,581,334
CAR WASHING APPARATUS
Donald E. Follis, Sylmar, Calif., assignor to California Car Wash, Sun Valley, Calif.
Continuation-in-part of application Ser. No. 739,234, June 24, 1968. This application Oct. 31, 1969, Ser. No. 873,768
Int. Cl. B60s 3/06
U.S. Cl. 15—21    17 Claims

ABSTRACT OF THE DISCLOSURE

A car wash apparatus comprising a frame pivotally supporting first and second pivotal arms which carry a vertically extending rotary brush and are biased to respective normal positions extending transversely and along the path of a car to be washed. Control means is connected with the second arm and cooperates with the biasing means to apply a relatively large unfolding force to the second arm and to, after initial unfolding, apply a relatively small unfolding force to the second arm whereby the brush will be contacted by the front of the car and will be carried forwardly therewith to carry the free extremity of the first arm forwardly. After the brush has traveled across the front of the car and clears the front corner thereof, it will travel rearwardly along one side thereof folding the second arm on the first arm and when the rear corner of the car clears the brush, the biasing means and control means will cooperate to apply such relatively large unfolding force to the second arm to initially move the brush forwardly and inwardly relatively rapidly to commence inward travel across the rear of the car and, thereafter, such control means and biasing means will cooperate to apply the relatively small unfolding force to the second arm to continue unfolding of the second arm at a rate sufficient to effect thorough cleaning of the rear of the car.

CROSS REFERENCE TO RELATED APPLICATION

This application is a continuation-in-part of U.S. application Ser. No. 739,234, filed Jan. 24, 1968, and now abandoned.

BACKGROUND OF THE INVENTION

Field of the invention

The present invention relates to a car washing apparatus including a brush for automatically washing the front, side and rear of an automobile.

Description of prior art

Car washing devices have been proposed which include brushes suspended in the pathway of a forwardly moving car to automatically wash the front, side and rear of such car as it moves thereby. A brush of this type is shown in U.S. Pat. No. 3,350,733. However, such prior art brushes suffer the undesirable characteristic that they are frequently caught in a depression in the front contour of certain automobiles thereby preventing continued travel across the front of such cars to enable the sides and rear portions thereof to be washed. When the prior art brushes are hung up in this manner and the conveyor moving the car through the washing apparatus continues forward movement thereof, sufficient forward force will be applied to the brush to flex the brush support and free the brush to be propelled forceably away from the car by the flexed support and into surrounding structure causing the brush to rebound off such structure and forceably back into the side of the car thereby denting the side of the car.

A further characteristic of prior art devices is that the brush, after traveling rearwardly relative to the side of a car, will remain substantially stationary for a short period of time before it commences forwardly and inwardly travel to wash the rear of the car thereby missing a portion of the back of the car.

SUMMARY OF THE INVENTION

The car washing apparatus of present invention is characterized by a framework which suspends a rotary brush centrally in the pathway of a car to be washed and is responsive to the force of the forwardly moving car to move forwardly with the car and across the front thereof, then travel rearwardly along one side thereof and, finally, move inwardly along the rear thereof. Cushioning means is included on the frame for providing freedom of brush travel throughout the path described above and for cushioning movement of the brush in situations where it hangs up on a forwardly projecting contour of the car until sufficient forward force is provided to cause the brush support to be flexed thereby disengaging such brush and freeing it to be propelled forceably away from the car by the stressed support. The cushioning means cushions such movement of the brush away from the car and prevents the brush from being propelled into surrounding structure and rebounding therefrom to forceably strike the side of the automobile, thus causing damage.

As an additional or alternative feature, the present invention may be provided with dampening means for restricting the speed of brush movement along the one side of the car to assure complete washing thereof whereby sufficient bias may be provided to the frame to cause the brush to respond immediately after the rear corner of the automobile passes to thereby rapidly commence its forward and inwardly travel to wash the rear of the car.

Other objects and features of the invention will become apparent from consideration of the following description taken in connection with the accompanying drawings.

DESCRIPTION OF THE DRAWINGS

FIG. 3 is an elevational view, in enlarged scale, taken along the lines 3—3 of FIG. 1;
FIG. 4 is a top view taken along the lines 4—4 of FIG. 2;
FIG. 5 is a vertical sectional view, in enlarged scale, taken along the lines 5—5 of FIG. 3;
FIGS. 6 and 7 are top plan views of a second embodiment of the car washing apparatus of present invention, the apparatus being shown in two different positions;
and
FIG. 8 is an enlarged top plan view of a portion of the car washing apparatus shown in FIG. 6.

DESCRIPTION OF THE PREFERRED EMBODIMENTS

Figure 1:
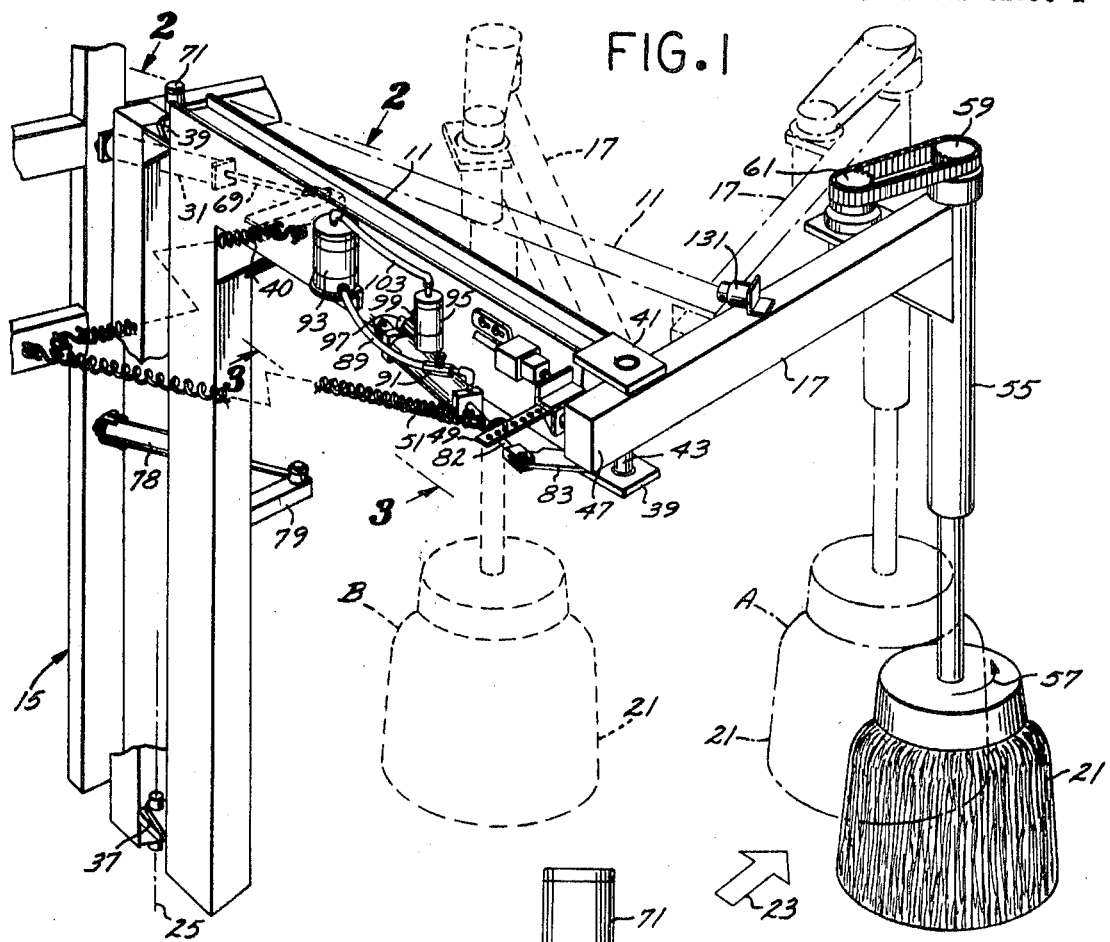
FIG. 1 is a broken perspective view of a car washing apparatus embodying the present invention.
Figure 2:
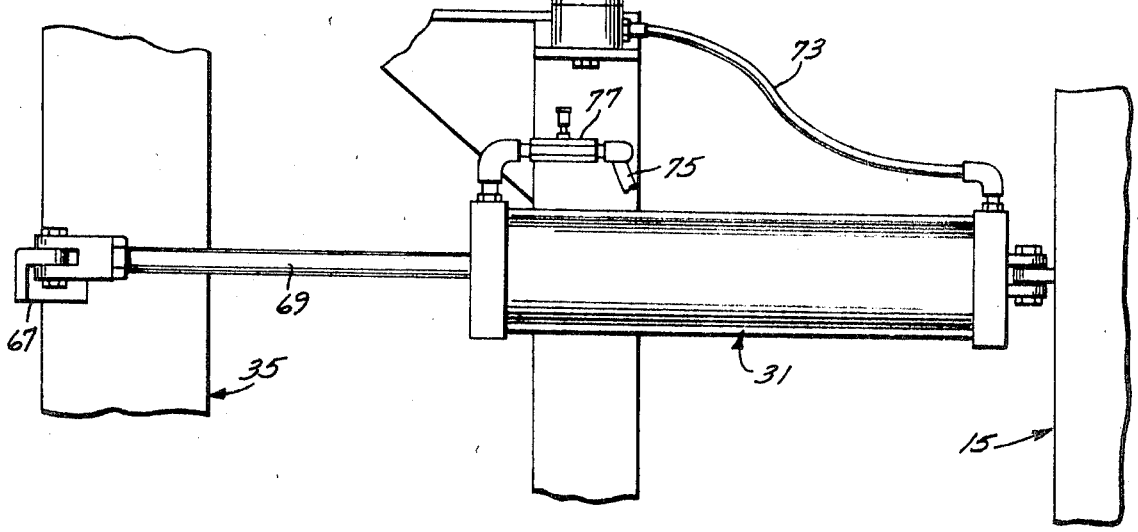
FIG. 2 is an elevational view, in enlarged scale, taken along the lines 2—2 of FIG. 1.

The embodiment of the car washing apparatus of present invention shown in FIG. 1 is intended for washing one half a car passing therethrough and another unit, which is a mirror image thereof, is provided for washing the other half of the car. The apparatus generally includes a primary arm 11 pivotally connected to a stationary frame 15 and carrying a pivotal secondary arm 17 on its free end. A rotary brush 21 is suspended from the free end of the second arm 17 and is normally disposed centrally in the pathway of a car to be washed. As a car travels through the car washing apparatus in the direction of the arrow 23, the brush 21 will be engaged causing the arms 11 and 17 to be pushed forward to rotate as a unit about the axis 25 of the primary arm 11 and move the brush 21 across the front of the car to the left hand corner thereof to the position A shown in broken lines. As the car continues forwardly, the primary arm 11 will be moved substantially back to its normal position shown in solid lines and the secondary arm 17 will, under the influence of the rotational friction between the brush 21 and the car, be caused to fold back on the primary arm to move the brush 21 to the position shown at B, at which time such brush will be at the left rear corner of the car and continued forward movement of the car will enable the secondary arm 13 to unfold thereby wiping the brush 21 across the rear of the car and bringing it back to its normal position as shown in solid lines. If, in its travel from its normal position to the position shown at A, the brush 21 becomes hung up on the front contour of the car and the car continues moving forward, substantial stress will be put on the support structure and the brush 21 will eventually disengage from the car and the stressed support structure will cause such brush to be propelled forceably away from the car causing the primary arm 11 to be rotated rapidly forwardly beyond the position shown in broken lines. At this time the hydraulic cylinder, generally designated 31, connected between the frame 15 and the primary arm 11 is effective to dampen further forward movement of such arm thereby bringing the brush 21 slowly to a stop and preventing it from forceably striking structure disposed along the side of the car path and rebounding therefrom and into the side of the car.

The primary arm 11 is formed by the horizontal portion of an inverted L-shaped member, generally designated 35, and is supported from the frame 15 by means of hinge elements 37 and 39 which define the vertical axis of rotation 25. A tension spring 40 connects between the primary arm 11 and the frame 15 to maintain such arm biased rearwardly to its normal position. The secondary arm 17 is supported between a pair of jaws 39 and 41 projecting from the free end of the primary arm 11 and having a pivot pin 43 extending therebetween. The secondary arm 17 includes a portion 47 which projects rearwardly of the pivot pin 43 and has a lever arm 49 mounted thereon which is connected with the frame 15 by a tension spring 51 to assist in maintaining the primary arm 11 biased rearwardly to its normal position and to maintain the secondary arm 17 unfolded to its normal position.

The brush 21 is suspended from the free end of the secondary arm 17 by means of a vertical shaft 55 and a drive shaft (not shown) projects axially therethrough to rotate the brush 21 in the direction of the directional arrow 57. The upper end of the drive shaft mounts a sprocket 59 which is driven by a sprocket 61 carried on the drive shaft of a hydraulic motor 63.

The vertical member of the L-frame 35 includes a lever arm 67 projecting forwardly therefrom for connection with the rod 69 of the hydraulic-pneumatic cylinder 31, the other end of such cylinder being connected to the frame 15. An oil pot 71 is connected with the dead-end of the cylinder 31 by means of a conduit 73 and flow of oil thereto is restricted by an orifice included in such cylinder. The rod end of the cylinder is connected with a hydraulic line 75 which includes a flow control valve 77, the line 75 also including a control valve (not shown) to retract the primary arm 11. The cylinder 31 is of the type that includes a predetermined amount of air therein for unrestricted exhaust through the above mentioned orifice into the oil pot 71 during the time the primary arm 11 is moving forwardly to its broken line position (FIG. 1) and to accomplish any additional forward movement, oil must be forced through such orifice thereby resisting further retraction of the piston rod 69 and cushioning further forward movement of the arm 11. The hydraulic-pneumatic cylinder 31 is commercially available from Alkon Products Corporation, Wayne, N.J. under the designation "Series D 70x12."

A shock absorber 78 is connected between a lever arm 79 extending from the vertical member of the frame 35 and the support frame 15 to restrict rapid forward rotation of the primary arm 11 but is ineffective to cushion the full force of the structure propelled into the frame 15 when the brush 21 is freed from a hung up condition.

Folding of the secondary arm 17 from its broken line position disposing the brush 21 at A to its folded position disposing the brush at B is resisted by a pneumatic-hydraulic cylinder 81 which is connected on its dead-end intermediate the primary arm 11 and has its rod 82 end-connected to a mounting flange 83 welded underneath the rearwardly projecting portion 47 of the secondary arm 17. Referring to FIGS. 3 and 4, connected to the rod end of the cylinder 81 is a conduit 89 having a flow control valve 91 therein, such conduit 89 leading to an oil pot 93. A smaller oil pot 95 is connected with the dead-end of the cylinder 81 by means of a conduit 97 having a flow control valve 99 therein. The tops of the oil pots 93 and 95 are in communication by means of a conduit 103.

Mounted on the free end of the primary arm 11 is a cylindrical bumper, generally designated 107, disposed in engageable alignment with the rearwardly projecting portion 47. Referring to FIG. 5, the bumper 107 is formed with a cylindrical barrel 109 welded to a bracket 111 mounted on the arm 11, such barrel receiving a cylindrical resilient stop 113 having its projecting end covered by a cap 115. The cap 115 is telescopically received within the barrel 109 whereby the stop 113 may be compressed to absorb the impact of the secondary arm 17.

A microswtich 119 in circuit with the conveyor moving the car through the car wash is carried from the primary arm 11 by a mounting bracket 121 and includes a projecting actuating arm 123 disposed in alignment with an actuator in the form of an angle 125 mounted on the lever arm 49.

Referring to FIGS. 1 and 4, a bumper 131, similar to the bumper 107, is carried by a bracket 135 mounted on top of the secondary arm 17 and is disposed in engageable alignment with the forward side of the primary arm 17 to limit folding of such secondary arm 17 towards the primary arm 11.

In operation, a car to be washed is moved through the car washing apparatus in the direction of the arrow 23 and will engage the brush 21 with its front end. This initial contact will be made at the central portion of the front of the automobile and the forward movement of the automobile, coupled with the rotational friction between the brush and the automobile, will move such brush to the left across the front of the forwardly moving automobile and the left front corner of such automobile will be reached at the time the brush reaches the position designated A. The brush will then commence movement rearwardly along the side of the automobile, thus folding the secondary arm 17 and directing the brush 21 to the position B. Such folding of the secondary arm 17 is restricted by means of the flow control valve 91 restricting flow from the control cylinder 81 to the oil pot 93 whereby the brush 21 will travel rearwardly relative to the side of the car at the desired speed to affect a thorough cleaning thereof. When the brush 21 reaches the position B and the left rear corner of the car passes thereby, the tension spring 51 will cause the secondary arm 17 to commence unfolding back towards the position shown in solid lines in FIG. 1. A predetermined amount of this unfolding is unrestricted and occurs rapidly under the bias of the spring 51 to insure that the brush 21 commences its forward travel immediately after the rear corner of the car is reached thereby assuring that none of the back of the car is missed. As this secondary arm 17 picks up momentum in its swing back to its normal position, the control cylinder 81 is again effective to dampen movement thereof by commencing to force oil through the restriction caused by the fluid ocntrol valve 99. This restriction continues throughout the remainder of the cycle, at which time the brush 21 is disposed in the position shown in solid lines in FIG. 1 and is ready for the following car.

Whenever it is desirable to pass a car through the car wash without making brush contact, as when a customer so requests, a remote control valve (not shown) is opened to pressurize the rod end of the cushioning cylinder through the conduit 77 to retract the primary arm 11 forwardly to move the brush 21 out of the path of the oncoming car.

If, during the above described washing process, the brush 21 hangs up on forwardly projecting contour of the car, the forward force of the car will attempt to push the brush 21 forwardly from its position A, thus attempting to extend the secondary arm on its pivot 43. Such rotation of the secondary arm 17 is restricted by the bumper 107 which is compressed to squat to the configuration shown in broken lines in FIG. 5. Such compression of the bumper 107 enables the rearward projection 47 of the secondary arm 17 to carry the actuator 125 into engagement with the actuation arm 123 of the microswitch 119 thereby breaking the circuit to the conveyor and discontinuing forward conveyance of the car. It will be clear that while the conveyor is attempting to move a car forward against the brush 21 hung up on the front thereof, the entire supporting structure will be put under substantial stress and if the brush 21 disengages from such contour, the brush will be propelled away from the car by such structure and will tend to rotate the primary arm 11 forwardly from its position shown in broken lines in FIG. 1. However, forward rotation of the primary arm 11 beyond its broken line position (FIG. 1) is restricted by the above described orifice in the pneumatic-hydraulic cylinder 31 which restricts communication of oil to the oil pot 71. Thus, the danger of the brush 21 springing free from its hungup position of the front of the car and careening into adjacent support structure to rebound into the side of the car, thereby causing damage, is avoided.

The car washing apparatus shown in FIGS. 6, 7 and 8 is similar to that shown in FIG. 1 and includes pivotally mounted primary and secondary arms 151 and 153, respectively, mounted from a cabinet 155. The pivoted end of the primary arm 151 includes a transversely extending lever arm 159 having a control cylinder 161 connected with the free end thereof for normally biasing such primary arm 151 to the position shown in FIG. 6 projecting generally transversely to the path of an automobile 163 which is to be washed. The secondary arm 153 includes a rearwardly projecting lever arm 167 which has a tension spring 169 connected therewith for biasing the primary arm 151 rearwardly to the position shown in FIG. 6 and, concurrently, biasing the secondary arm 153 to its unfolded position shown in FIG. 6.

Also connected with the rearwardly projecting lever arm 167 is the rod of a secondary arm control cylinder 171 which has its dead end carried from a mounting flange 173 on the primary arm 151. The rod end of the control cylinder 171 is connected with an air over oil reservoir 177 by means of a conduit 179 and air to such reservoir is provided through a conduit 181. Fluid to the conduit 181 is controlled by a three-way valve, generally designated 183, which includes an actuating arm carrying a roller 185 that is selectively engaged by an actuating plate 187 carried on the rear face of the primary arm 151. An air supply line 191 leads to the inlet of the three-way valve 183.

A second air over oil reservoir 195 is connected with the dead end of the control cylinder 171 and has air provided thereto through a conduit 197. Such reservoir 195 is connected with the dead end of the cylinder 171 by a conduit including a control valve 198 that serves to restrict fluid flow as the cylinder reaches its retracted position.

The car washing apparatus shown in FIGS. 6 through 8 operates similar to the car washing apparatus shown in FIG. 1. The car washing apparatus will normally be in the position shown in FIG. 6 with the primary arm 151 biased rearwardly to engage the actuating plate 187 with the roller 185 of the three-way valve 183 to thereby provide pressure to the air over oil reservoir 177 to pressurize the rod end of the control cylinder 171 to assist the spring 169 in maintaining the secondary arm 153 unfolded to the position shown in FIG. 6. When the automobile 163 to be washed engages the brush 199 carried on the free end of the secondary arm 153 the free extremity of the primary arm 151 will be carried forwardly to disengage the actuating plate 187 from the roller 185 of the three-way valve 183 to thereby exhaust pressure from the rod end of the cylinder 171 to enable the rod to be freely extended. When the brush 199 reaches the left front corner of the car 163, the rotational friction of such brush on the side of the car will cause the secondary arm 153 to fold on the primary arm 151 as such brush travels rearwardly along the side of such car.

When the primary arm 151 reaches this rearward position shown in FIG. 7, the actuating plate 187 will engage the roller 185 to open the valve 183 and provide pressure to the reservoir 177 and, consequently, to the rod end of the hydraulic cylinder 171 to provide an additional biasing force on the secondary arm 153 to cause the free end thereof to move rapidly forward after the left rear corner of the automobile 163 is cleared to thereby assure washing of the rear corner of the automobile. Thus, the brush 199 can move rapidly rearwardly along the side of the car, but will be moved rapidly forwardly when it clears the rear corner of the car to assure contact with the entire rear of such car and enable cars to be passed thereby at a faster rate. Further, the restrictor valve 198 will restrict passage of hydraulic fluid from the cylinder 171 as the secondary arm 153 approaches its unfolded position to thereby slow brush travel across the rear of the car 163 to assure effective washing thereof.

From the foregoing description it will be apparent that the car washing apparatus of present invention provides means for stopping the automobile conveyor when the washing brush hangs up on the car, thereby avoiding damage to the apparatus. Also, if the brush springs loose from its hung-up condition before the conveyor can be stopped, careening of the brush into surrounding structure and rebound into the automobile is prevented. Further, means is provided for controlling travel of the brush along the side and rear of the car to thereby enable bias means on the support arms of sufficient force to assure that the brush follows the contour of the car closely as it passes around the rear corner thereof to effect thorough washing.

Various modifications and changes may be made with regard to the foregoing description without departing from the spirit of the invention.

I claim:
1. Car washing apparatus comprising:
  a frame disposed on one side of the path of a car to be washed;
  a first arm pivotally supported on one end from said frame and, in its normal position, projecting over said path;
  a second arm carried pivotally on one end from the free end of said first arm and, in its normal position, extending parallelly of said path, said second arm being foldable back on said first arm;
  a rotary brush suspended from the free end of said second arm;
  drive means for driving said brush;
  biasing means urging said first and second arms to their respective normal positions; and
  control means connected with said second arm and cooperating with said biasing means to apply a relatively large unfolding force to said second arm during initial unfolding thereof and to, after such initial unfolding, apply a relatively small unfolding force to said second arm whereby said brush will be contacted by the front extremity of said car and will be carried forwardly thereby to carry the free extremity of said first arm forwardly while said brush travels across the front of said car to clear one corner thereof and travel rearwardly along one side thereof thereby folding said second arm on said first arm and when the rear corner of said car clears the brush, said biasing means and control means will cooperate to apply said relatively large unfolding force to said second arm to initially move said brush forwardly and inwardly relatively rapidly to commence inward travel across the rear of said car and to, thereafter, apply said relatively small unfolding force to said second arm to continue unfolding of said second arm at a rate sufficient to effect thorough cleaning of the rear of said car.

2. Car washing apparatus as set forth in claim 1 that includes:
retraction means connected between said first arm and said frame for retracting said first arm forwardly to retract said brush from said path.

3. Car washing apparatus as set forth in claim 2 wherein
said retraction means includes a hydraulic cylinder, a pressurization source, a conduit connecting said pressurization source with said cylinder and a control valve for adjusting the rate at which hydraulic fluid is supplied to said cylinder to control the rate of retraction of said primary arm.

4. Car washing apparatus as set forth in claim 1 wherein:
said control means includes a fluid cylinder connected with said second arm; and
switch means responsive to a selected position of one of said arms to pressurize said cylinder to cause said cylinder to cooperate with said biasing means to apply said relatively large unfolding force to said second arm.

5. Car washing apparatus as set forth in claim 4 wherein:
said switch means is responsive to said normal position of said first arm to pressurize said cylinder to thereby maintain said cylinder normally pressurized when said first arm is in its normal position.

6. Car washing apparatus as set forth in claim 1 wherein:
said control means includes a fluid cylinder connected with said second arm; and
orifice means for, after a predetermined amount of folding of said second arm, restricting fluid flow from said cylinder during folding of said second arm to cushion said second arm as it reaches its folded position.

7. Car washing apparatus as set forth in claim 6 wherein:
said control means includes a fluid reservoir;
conduit means connecting said fluid reservoir with said orifice means; and
a combination of hydraulic fluid and gas in said cylinder in a ratio for causing the gas to be exhausted through said orifice during initial unfolding of said second arm and to, thereafter, cause said hydraulic fluid to be exhausted through said orifice to restrict the rate of unfolding to restrict the speed of said brush as it travels across the rear of said car.

8. Car washing apparatus a set forth in claim 1 that includes:
dampening means connected with said first arm for permitting relatively free travel of said first arm to the most forward position reached in normal washing of said car and for dampening forward movement of said first arm forwardly of said most forward position whereby if said brush hangs up on the front of a forwardly moving car and subsequently springs loose to be propelled forwardly of said most forward position said dampening means will slow the rate of forward travel of said first arm to prevent said first arm from moving sufficiently far forward to cause said brush to slam into said frame and rebound therefrom and into the side of said car.

9. Car washing apparatus as set forth in claim 8 wherein:
said dampening means includes means connected with said second arm for permitting a selected amount of relatively free folding of said second arm on said first arm and for, after said relatively free folding, restricting folding of said second arm whereby said second arm may fold relatively freely to commence rearward travel of said brush after said front corner of said car is cleared and if said brush hangs up on the front of said car and thereafter springs loose to be propelled forwardly causing said second arm to fold beyond said selected amount, further folding of said secondary arm on said first arm will be restricted to prevent said brush from slamming into said frame and rebounding into said car.

10. Car washing apparatus as set forth in claim 1 for use with a conveyor for conveying cars along said path and that includes:
a resilient stop mounted on one of said arms for abutting the other of said arms to limit unfolding of said second arm beyond said normal position; and
switch means carried by said one arm for stopping said conveyor, said switch means being disposed behind the plane of said stop whereby if said brush hangs up on the front of said car, said car will carry said arms forwardly and will tend to unfold said second arm beyond said normal position thereby depressing said stop and enabling said other arm to engage said switch and stop said conveyor.

11. Car washing apparatus as set forth in claim 1 wherein:
said biasing means includes a biasing element connected with said second arm for biasing both said first and second arms to their respective normal positions;
said control means includes a fluid cylinder connected with said first arm; and
orifice means for restricting fluid flow from one end of said cylinder to restrict rearward movement of said first arm to control the speed with which said brush travels rearwardly along the side of said car.

12. Car washing apparatus as set forth in claim 1 wherein:
said control means includes means for, after a predetermined amount of folding of said second arm on said first arm, restricting said rate of folding to cause said brush to move rearwardly along the side of said car at a desired speed to effect thorough cleaning thereof.

13. Car washing apparatus comprising:
a frame disposed on one side of the path of a car to be washed;
a first arm supported pivotally on one end from said frame and normally projecting over said path;
a second arm supported pivotally on one end from the free end of said first arm and normally extending forwardly along said path;
a rotary brush suspended from the free end of said second arm;
drive means for said brush;
biasing means urging said first and second arms into their respective normal positions;
control means connected with at least one of said arms for permitting a predetermined amount of relatively free travel of said one of said arms from its normal position and for restricting travel of said one arm beyond said predetermined amount and toward said frame whereby when said brush is contacted by the front of said car it will be carried forwardly thereby and across the front thereof and if said brush hangs up on a projection in front of said car and has sufficient force applied thereto by the forwardly moving car to spring said brush loose and cause it to be propelled forwardly, said control means will restrict the forward travel of said one arm to slow the forward travel of said brush and prevent it from slamming into said frame and rebounding into the side of said car.

14. Car washing apparatus as set forth in claim 13 wherein:

said control means includes a control element connected with the other of said arms for permitting a predetermined amount of unrestricted forward movement thereof and to, thereafter, restrict further forward movement of said other arm whereby forward movement of both said arms will be restricted after said brush springs loose from a hung up condition.

15. Car washing apparatus as set forth in claim 13 wherein:

said control means includes a fluid cylinder connected with said one arm and orifice means connected with one end of said cylinder for, after said predetermined amount of forward travel of said one arm, restricting fluid flow from said fluid cylinder to restrict the rate of further forward travel of said one arm.

16. Car washing apparatus as set forth in claim 15 wherein:

said control means includes a second fluid cylinder connected with the other of said arms and orifice means connected with said cylinder for, after said predetermined amount of forward travel of said other arm, limiting further forward travel of said other arm to prevent said brush from springing loose from a hung up condition and slamming forwardly into said frame and rebounding into said car.

17. Car washing apparatus as set forth in claim 13 that includes:

retraction means connected with said first arm for retracting said first arm forwardly to retract said brush from said path.

References Cited

UNITED STATES PATENTS

| | | | |
|---|---|---|---|
| 3,310,824 | 3/1967 | Beer | 15—21(C.3) |
| 3,350,733 | 11/1967 | Hanna | 15—21(C.3) |

OTHER REFERENCES

Auto Laundry News; January 1968, page 15.

EDWARD L. ROBERTS, Primary Examiner